United States Patent
Koyama et al.

(10) Patent No.: US 6,859,508 B1
(45) Date of Patent: Feb. 22, 2005

(54) FOUR DIMENSIONAL EQUALIZER AND FAR-END CROSS TALK CANCELER IN GIGABIT ETHERNET SIGNALS

(75) Inventors: Tetsu Koyama, San Jose, CA (US); Jason Peng, Sunnyvale, CA (US); Paul E. Cohen, San Jose, CA (US)

(73) Assignee: NEC Electronics America, Inc., Santa Clara, CA (US)

(*) Notice: Subject to any disclaimer, the term of this patent is extended or adjusted under 35 U.S.C. 154(b) by 603 days.

(21) Appl. No.: 09/672,644

(22) Filed: Sep. 28, 2000

(51) Int. Cl.$^7$ ................................................. H03D 3/24
(52) U.S. Cl. ...................... 375/348; 370/201; 455/501
(58) Field of Search ........................ 375/348; 343/700; 455/276

(56) References Cited

U.S. PATENT DOCUMENTS

| | | | | | |
|---|---|---|---|---|---|
| 4,631,734 A | * | 12/1986 | Foschini | ...................... | 375/235 |
| 4,862,483 A | * | 8/1989 | Clark | .......................... | 375/341 |
| 5,005,188 A | * | 4/1991 | Clark | .......................... | 375/341 |
| 5,128,747 A | * | 7/1992 | Isnardi et al. | ............... | 348/470 |
| 5,181,198 A | * | 1/1993 | Lechleider | .................. | 370/286 |
| 5,675,394 A | * | 10/1997 | Choi | .......................... | 348/614 |
| 6,009,120 A | * | 12/1999 | Nobakht | ...................... | 375/229 |
| 6,327,302 B1 | * | 12/2001 | Shen | .......................... | 375/232 |
| 6,477,200 B1 | * | 11/2002 | Agazzi et al. | ............... | 375/233 |
| 6,519,282 B1 | * | 2/2003 | Huber et al. | ................. | 375/232 |
| 6,553,085 B1 | * | 4/2003 | Trans | .......................... | 375/346 |
| 2001/0038674 A1 | * | 11/2001 | Trans | .......................... | 375/355 |

OTHER PUBLICATIONS

Loginov, Kochanov. implementiong The High Speed Modem with Multidimensional Modulation Using the TMS320C542 DSP.*

* cited by examiner

*Primary Examiner*—Stephen Chin
*Assistant Examiner*—Harry Vartanian
(74) *Attorney, Agent, or Firm*—Skjerven Morrill LLP (57) ABSTRACT

A multidimensional equalizer and cross talk canceller for a communication network that simultaneously removes far end cross talk NEXT) and intersymbol interference (ISI) from a received signal. A multidimensional-pair channel is treated as a single multidimensional channel and a receiver in the communication network equalizes received signals through the use of the multidimensional equalizer. A decision feedback equalizer determines a multidimensional steepest descent gradient to adjust matrix coefficients.

10 Claims, 7 Drawing Sheets

4D-EQLFXC Simulation   (N=20, μ=0.01)

4 1D-EQLs Simulation (N=50, μ=0.01)

FIG. 6B
*(Prior Art)*

FOUR DIMENSIONAL EQUALIZER AND FAR-END CROSS TALK CANCELER IN GIGABIT ETHERNET SIGNALS

BACKGROUND OF THE INVENTION

1. Field of the Invention

This invention relates generally to noise reduction in communication networks. More specifically, this invention relates to simultaneously removing far-end cross talk and inter-symbol interference from signals transmitted over an N-dimensional communication network.

2. Description of the Related Art

Insatiable demand for bandwidth in LAN applications has motivated the evolution of high-speed 1000BASE-T Ethernet from its predecessors, such as Fast Ethernet 100BASE-T and 10BASE-T.

In order to achieve the high throughput of Gigabit Ethernet, impairments such as cable attenuation, echo, near-end cross talk (NEXT), and far-end cross talk (FEXT) over the cable channel(s) must be reduced as much as possible. Another source of errors in baseband communication systems is intersymbol interference (ISI) arising from the dispersive nature of the communications channel, i.e. pulse distortion arising from the non-ideal filtering characteristics of the transmission channel leading to interference between symbols.

Attenuation, echo, and NEXT can be controlled through the use of a linear equalizer, a decision feedback equalizer (DFE), echo cancelers, and NEXT cancelers. However, none of these conventional components removes FEXT noise.

It is nonetheless desirable to reduce errors introduced in transmitted signals from ISI and FEXT. Although the magnitude of FEXT noise is usually much smaller than NEXT interference, any reduction of FEXT can only improve the performance of a Gigabit Ethernet Transceiver, as well as other communication networks having similar impairments. It is also true that if FEXT and ISI is removed, then the resulting Gigabit Ethernet Transceiver may be usable with cable that is either longer or of inferior quality than specified by industry standards.

SUMMARY OF THE INVENTION

In one embodiment, a multidimensional equalizer and cross talk canceler for a communication network is provided that simultaneously removes far end cross talk (FEXT) and intersymbol interference (ISI) from a received signal. A multidimensional channel is treated as a single multidimensional channel and a receiver in the communication network equalizes received signals through the use of the multidimensional equalizer. A multidimensional equalizer and cross talk canceler for a communication network that simultaneously removes far end cross talk (FEXT) and intersymbol interference (ISI) from a received signal. A multidimensional-pair channel is treated as a single multidimensional channel and a receiver in the communication network equalizes received signals through the use of the multidimensional equalizer. A decision feedback equalizer determines a multidimensional steepest descent gradient to adjust matrix coefficients that are proportional to estimates of $$\frac{\partial e_n}{\partial Q_k^{i,j}}, \text{ wherein } Q_k^{i,j} \leftarrow \left(Q_k^{i,j} - \mu \cdot \left(\frac{\partial e_n}{\partial Q_k^{i,j}}\right)\right) \text{ and}$$

$$\frac{\partial e_n}{\partial Q_k^{i,j}} = 2 \cdot (Z_n^i - X_{n \leftarrow p}^i) \cdot Y_{n-k}^j.$$

The equalizer includes:

a vector data unit delay operator that passes the received data vector $Y_n$ through a series of unit delay operators to generate successive tap input data $Y_n, Y_{n-1}, Y_{n-2}$;

a first matrix multiplication operator that receives a 1×N matrix $Y_{n-k}$ from the unit delay operator and multiplies it with the N×1 matrix of scaled vector error data $(Z_n-X_n)$ to generate a N×N adjustment matrix;

a matrix summation operator that adds the adjustment matrix to a $Q_{n-k}$ tap matrix and outputs a corrected tap matrix $Q_{n-k+1}$;

matrix tap unit delay operator that receives the corrected tap matrix $Q_{n-k+1}$, and introduces a one cycle delay to generate a $Q_{n-k}$ tap matrix; and a second matrix multiplication operator that multiplies the $Q_{n-k}$ tap matrix from the matrix tap unit delay operator by the $Y_{n-k+1}$ vector from the vector data unit delay operator.

The multidimensional equalizer and cross talk canceler of the present invention exhibits significantly better noise margin compared to multiple scalar equalizers and advantageously permits the use longer cable runs or the use of physical channels that are in some way inferior.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
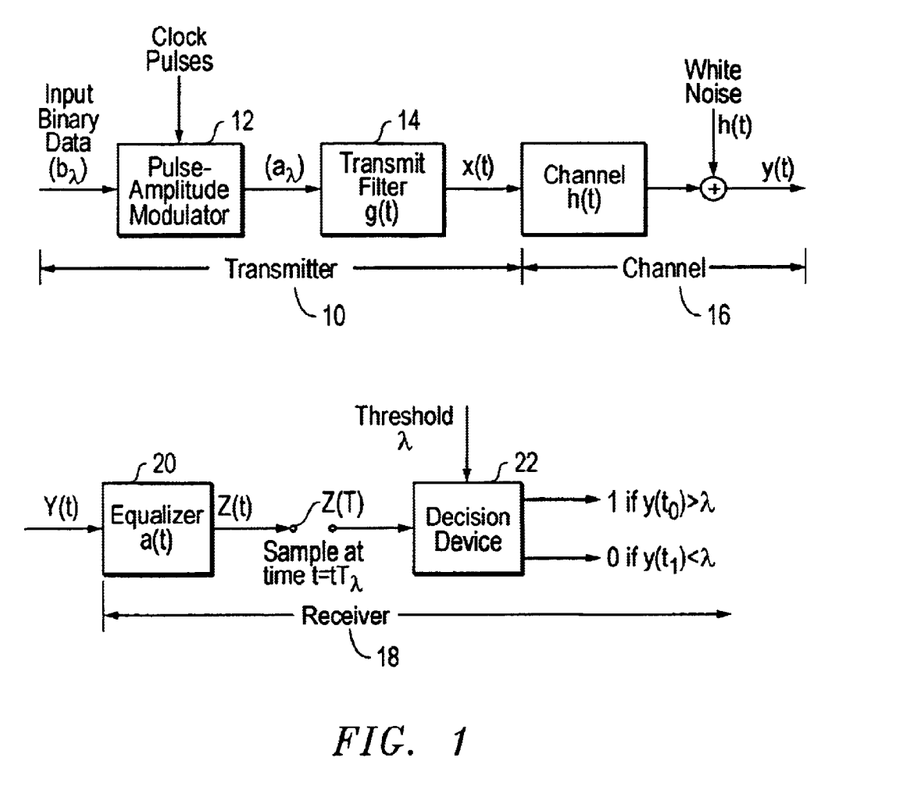
FIG. 1 is a diagram of a generic communication channel between a transmitter and a receiver.

FIG. 1 shows a generic model of a baseband transmission system 10. An incoming binary sequence $\{b_k\}$ of symbols 0 and 1, each of duration $T_b$ is transformed by the pulse amplitude modulator 12 into a sequence of short pulses $\{a_k\}$ of amplitudes +1 and −1. These short pulses are applied to a transmit filter 14 of impulse response g(t) producing the transmitted signal X(t). Note that in 1000BASE-T over a copper channel, the signals on each wire pair are not just 0 or 1, but rather, five different voltage levels (0, ±1 and ±2) are applied.

The signal X(t) is modified by transmission through a channel 16 of impulse response h(t) and also has some noise n(t) added to it, producing noisy signal Y(t). At receiver 18, the noisy signal Y(t) is passed through a receiver equalizer 20 and the resulting filtered output Z(t) is synchronously sampled at intervals of $T_b$. The samples, Z(T), are passed to a threshold decision device 22, which outputs a 1 if the sample is greater than the threshold 1, and 0 if less than the threshold.

Figure 1A:
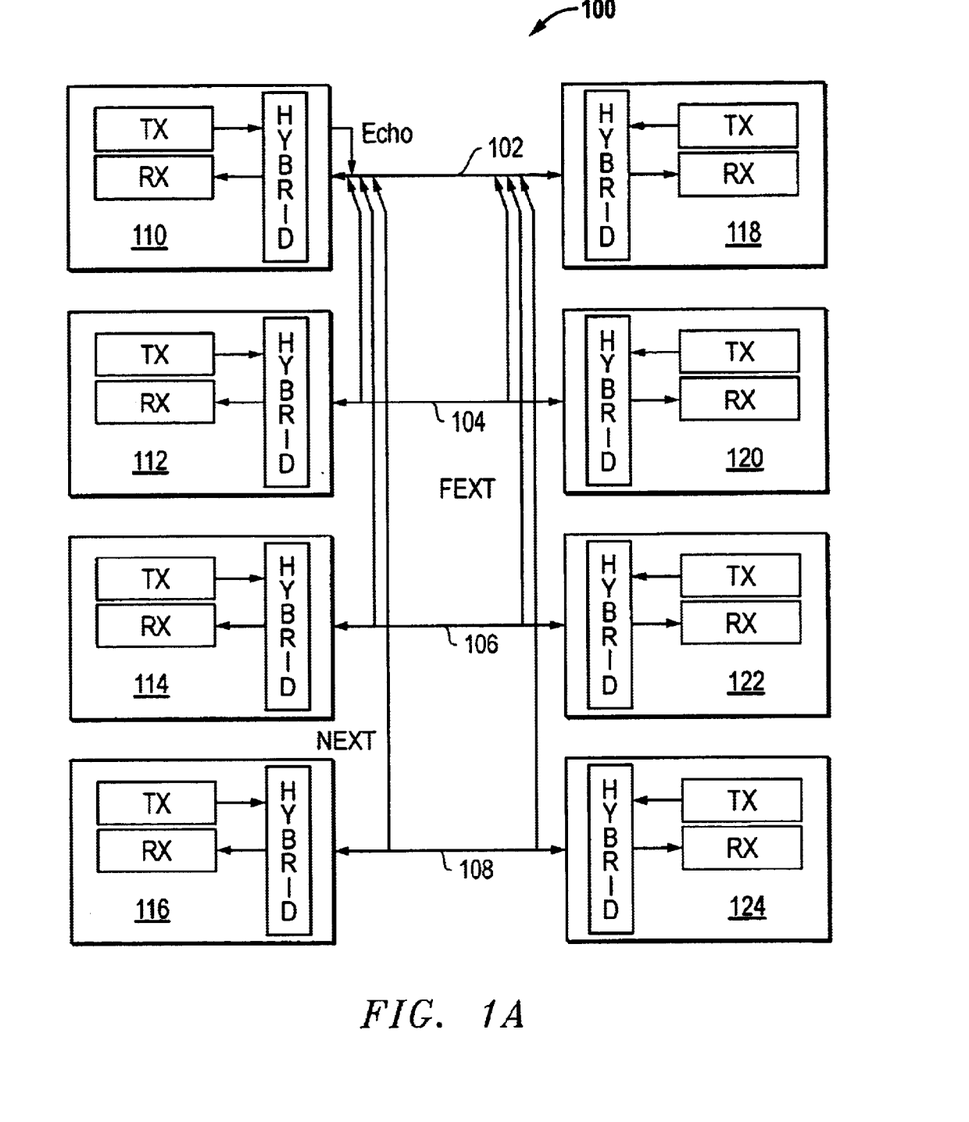
FIG. 1a is a diagram of components typically included in a four channel Gigabit Ethernet network.

Referring now to FIG. 1a, an Ethernet network 100 capable of full-duplex 4-channel communication over a copper medium includes four twisted pair cables 102, 104, 106, 108. One (1) gigabit per second (Gb/s) throughput is achieved using eight transceivers (four at each end) 110 through 124 as shown in FIG. 1a. Each transceiver 110 through 124 achieves throughput of 250 Mb/s, but operates at approximately 290 Mb/s to accommodate coding and signaling overhead.

Hybrids in transceivers 110 through 124 separate transmit and receive signals on each wire pair. The transmitters (denoted by "TX" in FIG. 1) in transceivers 110 through 124 perform the relatively simple task of outputting packets of data that include the address of a destination receiver. Data received by the receivers in transceivers 110 through 124 is subject to errors due to cable attenuation, echo from the transmitter, near-end cross talk (NEXT) from one or more adjacent transmitters, and far-end cross talk (FEXT) from transmitters at the other end of the cable.

Crosstalk is unwanted signals coupled between adjacent wire pairs. Each two-wire pair is affected by crosstalk from the adjacent three pairs. Crosstalk is characterized in reference to the transmitter. NEXT is crosstalk that appears at the output of a wire pair at the transmitter end of the cable. FEXT is crosstalk that appears at the output of a wire pair at the far end of the cable from the transmitter. For example, the receiver in transceiver 110 may be subject to NEXT from transmitters in tranceivers 112, 114, and 116, while the receivers in transceivers 110, 112, 114, and 116 maybe subject to FEXT from transceivers 118, 120, 122 and 124.

Figure 2:
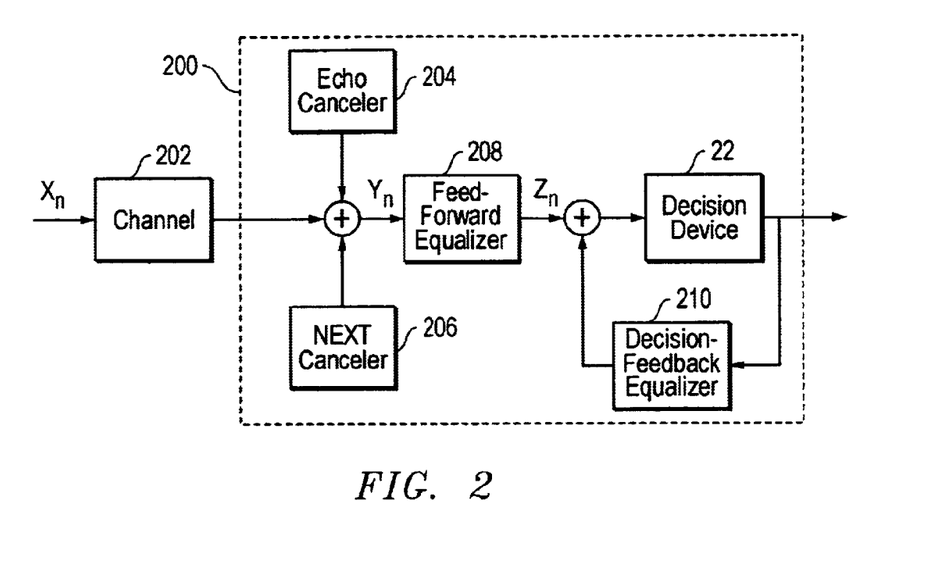
FIG. 2 is a block diagram of a receiver for signals in an Ethernet network.

Referring now to FIG. 2, receiver 200 receives data, denoted $Y_n$. When a signal, $X_n$ is applied to a channel, ideally it is transmitted only to the far end of that channel (i.e., travels in only one direction). In practice, part of the signal is reflected back toward the transmitter due to impedance discontinuities within the channel. The amount of signal reflected back is characterized by return loss. The greater the return loss, the less the signal is reflected. Return loss becomes more significant at elevated frequencies. To reduce or eliminate errors in transmission, the reflected signal must be small compared to the desired receive signal at all relevant frequencies. Since the desired receive signal is coming from the far end of the cabling, it has been reduced in size by the attenuation of the cabling. The amount of undesired reflected signal may quickly exceed the desired receive signal as frequency increases. This is unacceptable for error free transmission.

The effects of the undesired reflected signal is substantially reduced using known digital return loss cancellation, also referred to as "echo cancellation," techniques in echo canceller 204. In the known techniques, echo canceller 204 predicts the amplitude and echo response as a function of time. The digital "taps" of a delay line filter are adjusted accordingly, and the predicted echo response is subtracted from the total incoming receive signal to "cancel" the effect of the echo. More specifically, a portion of the signal transmitted from the transceiver end is subtracted, a portion of the previous bit transmitted from the transceiver end is subtracted, a portion of the bit before, etc. The magnitude of the portion subtracted is stored in digital delay line "taps." It should be noted that the echo is uncorrelated to the desired signal coming from the other end of the cabling. By slowly adjusting the taps, the echo canceller will track only the echo, thus avoiding cancelling the desired receive signal.

NEXT canceller 206 uses techniques similar to echo canceller 204 to cancel noise due to near end cross talk. The correlation between the transmit signal applied to one pair and the receive signal on another pair can be determined in terms of magnitude and time delay. Since each receive pair is corrupted with near-end crosstalk noise from three other pairs, each receiver requires its own NEXT canceller 206.

Attenuation refers to the situation where the amplitude of a signal diminishes as it travels down the length of the cable. High frequency signals (the sharp edges of digital pulses) are attenuated more than low frequency signals and this results in distortion or jitter unless it is compensated.

Equal level far-end crosstalk (ELFEXT) is FEXT with the cable attenuation removed to provide equal-level comparisons, i.e., crosstalk and receive signals voltages are compared at the end of the cabling opposite the transmitter. Signal equalization compensates for signal distortion introduced by the communication channel 16 (FIG. 1). As noted previously, broadband signals are distorted as they pass along the line, causing inter-symbol-interference (ISI). Receiving signals with large ISI is difficult because the receiver 200 cannot tell the difference between the current symbol and the previous one.

To compound the problem, feed-forward equalizer 208 increases ISI as it whitens noise. Unlike feed-forward equalizer 208, decision-feedback equalizer (DFE) 210 does not modify the noise. Therefore, DFE 210 is used to clean up the ISI generated by the channel 202 and the feed-forward equalizer 208. Feed forward equalizer 208 typically includes a finite impulse response (FIR) filter. DFE 210 includes a feedback equalization filter and provides better signal equalization than feed forward equalizer 208 alone, especially when the transmission medium introduces strong signal attenuation within specific frequency regions.

Figure 2A:
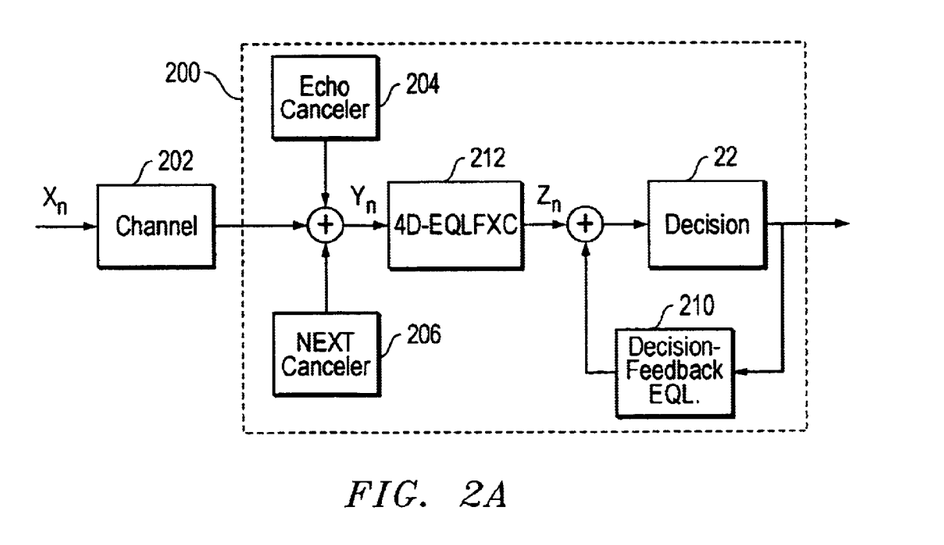
FIG. 2a is a block diagram of a receiver for signals in an Ethernet network in accordance with the present invention.

Referring now to FIG. 2a, in one embodiment, the present invention provides a four dimensional DFE (4D-EQLFXC) 212 that efficiently reduces FEXT and ISI by simultaneously equalizing the input signal and cancelling FEXT in the four receivers.

Receiver 200 detects the signal $Y_n$ at time n. The 4D-EQLFXC 212 of the present invention reduces the effects of ISI and FEXT among each of the four channels 202 and includes feed forward equalizer 208 and 4D-EQLFXC 212 that operate on the $\{Y_n\}$ sequence to determine an estimate of $\{Z_n\}$ and $\{X_n\}$. It is assumed that feed forward equalizer 208 can be constructed in the form $$Z_n = \sum_{k=0}^{N} Q_k \cdot Y_{n-k},$$

(N: tap length)

The higher the number of taps that are used, the more noise reduction is achieved, however, a higher number of taps increases power consumption and expense. Therefore, simulations are used to determine the number of taps required to achieve acceptable noise reduction.

For a four dimensional system, i.e., four channels, $X_n$, $Y_n$, and $Z_n$ are four column (channel) vectors, whose coordinates are referenced with superscripts. That is, $$X_n = <X_n^1, X_n^2, X_n^3, X_n^4>$$

$$Y_n = <Y_n^1, Y_n^2, Y_n^3, Y_n^4>$$

$$Z_n = <Z_n^1, Z_n^2, Z_n^3, Z_n^4>$$

and $Q_k$ in general is a 4×4 symmetric matrix representing one tap matrix of 4D-EQLFXC coefficients. There is one tap matrix for each tap; each tap matrix has size K×K where K is the number of channels. Superscripts are again used to designate individual entries.

$$Q_k = \begin{bmatrix} Q_k^{1,1} & Q_k^{1,2} & Q_k^{1,3} & Q_k^{1,4} \\ Q_k^{2,1} & Q_k^{2,2} & Q_k^{2,3} & Q_k^{2,4} \\ Q_k^{3,1} & Q_k^{3,2} & Q_k^{3,3} & Q_k^{3,4} \\ Q_k^{4,1} & Q_k^{4,2} & Q_k^{4,3} & Q_k^{4,4} \end{bmatrix}$$

The error, $e_n$, is defined as the distance between $Z_n$ and $X_n$, which can be determined as follows:

$$e_n = \|Z_n - X_{n-p}\|^2 = \left(\sum_{i=1}^{4} (Z_n^i - X_{n-p}^i)^2\right).$$

Where p is an integer greater than or equal to 0, and $e_n$ is defined as the distance between $Z_n$ and $X_{n-p}$. Typically, $p=(N+1)/2$ if N is odd, or is chosen close to this value. Values for n, i, j and k are fixed, with $1=i$, $j=4$, and $k=N$. Applying the least mean square (LMS) algorithm, an estimate of the gradient $\nabla_n$ with coordinates $$\frac{\partial e_n}{\partial Q_k^{i,j}}$$

is determined as follows:

$$\frac{\partial e_n}{\partial Q_k^{i,j}} = \frac{\partial}{\partial Q_k^{i,j}} \sum_{i=1}^{4} (Z_n^i - X_{n-p}^i)^2$$

$$= 2 \cdot \sum_{i=1}^{4} (Z_n^i - X_{n-p}^i) \cdot \frac{\partial Z_n^i}{\partial Q_k^{i,j}}$$

$$= 2 \cdot \sum_{i=1}^{4} (Z_n^i - X_{n-p}^i) \cdot \frac{\partial}{\partial Q_k^{i,j}} \sum_{k=0}^{N} \sum_{v=1}^{4} Q_k^{i,v} \circ Y_{n-k}^v$$

$$= 2 \cdot (Z_n^i - X_{n-p}^i) \cdot Y_{n-k}^j$$

Note that coordinates with $i=j$ relate to channel equalization while those with $i \neq j$ relate primarily to FEXT cancellation.

The present invention uses the steepest descent method to follow the gradient to an optimal solution. The gradient is a vector (in this case in a space of dimension 16N, where N is the number of taps) that points in the direction of maximum increase in the error function. An example of an adaptive steepest descent method for time instance n+1, is represented by:

$$Q_k^{i,j} \leftarrow \left( Q_k^{i,j} - \mu \cdot \left( \frac{\partial e_n}{\partial Q_k^{i,j}} \right) \right)$$

in which $\mu$ is a constant that regulates the step size.

The 4D-EQLFXC 212 initially assigns values to the matrices $\{Q_k : 1 \leq k \leq N\}$. For example, the values can each be set initially to the zero matrix except for the $p^{th}$ matrix which is set to the identity matrix. For potentially faster convergence, the values can be preloaded by measuring the characteristics of typical channels, or alternatively, from the preceding training sequence.

During each cycle of equalizer training, the matrices are updated by a vector amount that is proportional to the gradient, as estimated using the partial derivative of $\epsilon_n$ and $e_n$ which are determined as shown hereinabove.

Note that $Z_n^i$ and $Y_{n-k}^j$ can be measured directly. During training, the $X_n^i$ terms are known to be either 0 or ±2 and so can be determined with reasonable confidence. As previously noted, the computation involved in estimating these partial derivatives can be reduced by assuming that the $Q_i$ are symmetric.

After the training period, the $X_n^i$ terms are no longer known to be either 0 or ±2 but they are still known to be 0, ±1 or ±2, as specified in IEEE Std 802.3ab-1999, in tables 40-1, 40-2 and section 40.3.1.3.6. Assuming that the channel impairments are largely removed, the $X_n^i$ terms can still be determined with reasonable confidence. It can be beneficial to continue making the adjustments, although the adjustments can be made less aggressively, i.e., with a smaller constant $\mu$ of proportionality applied to the gradient.

Figure 3:
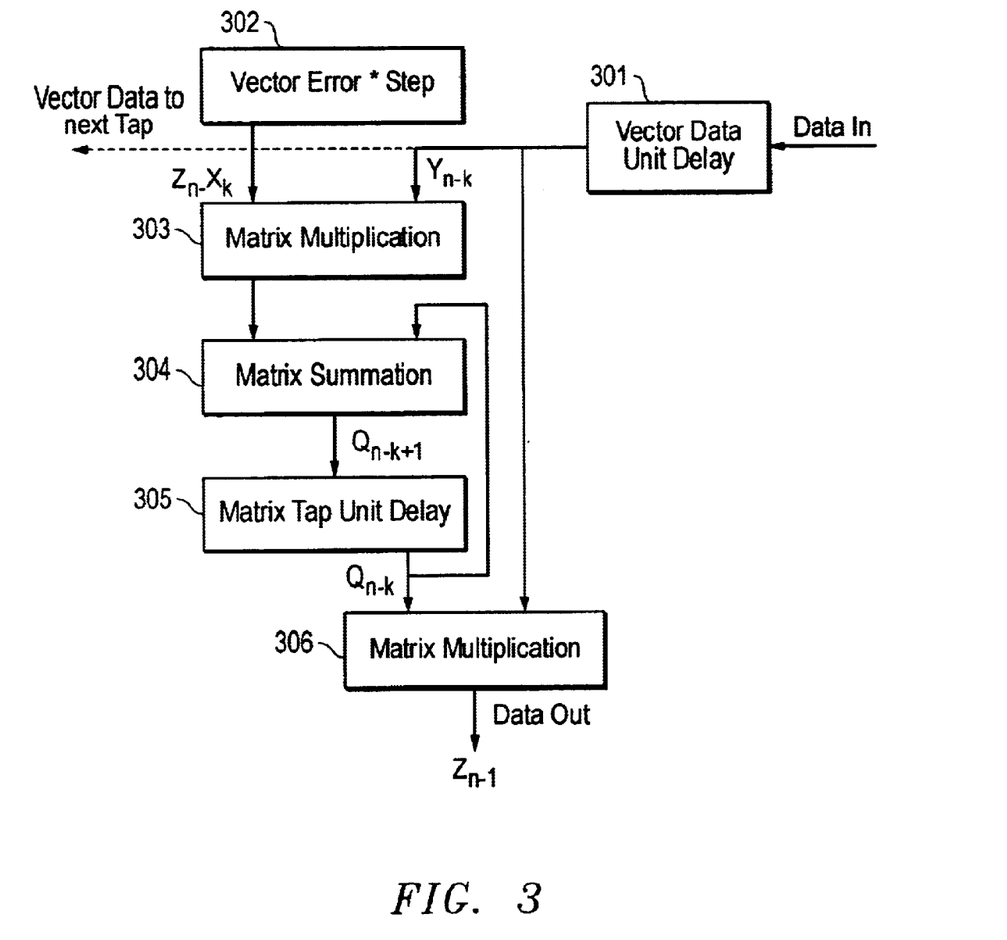
FIG. 3 is a block diagram of a single tap of a four dimensional equalizer and far end cross talk canceller in accordance with the present invention.
Figure 4:
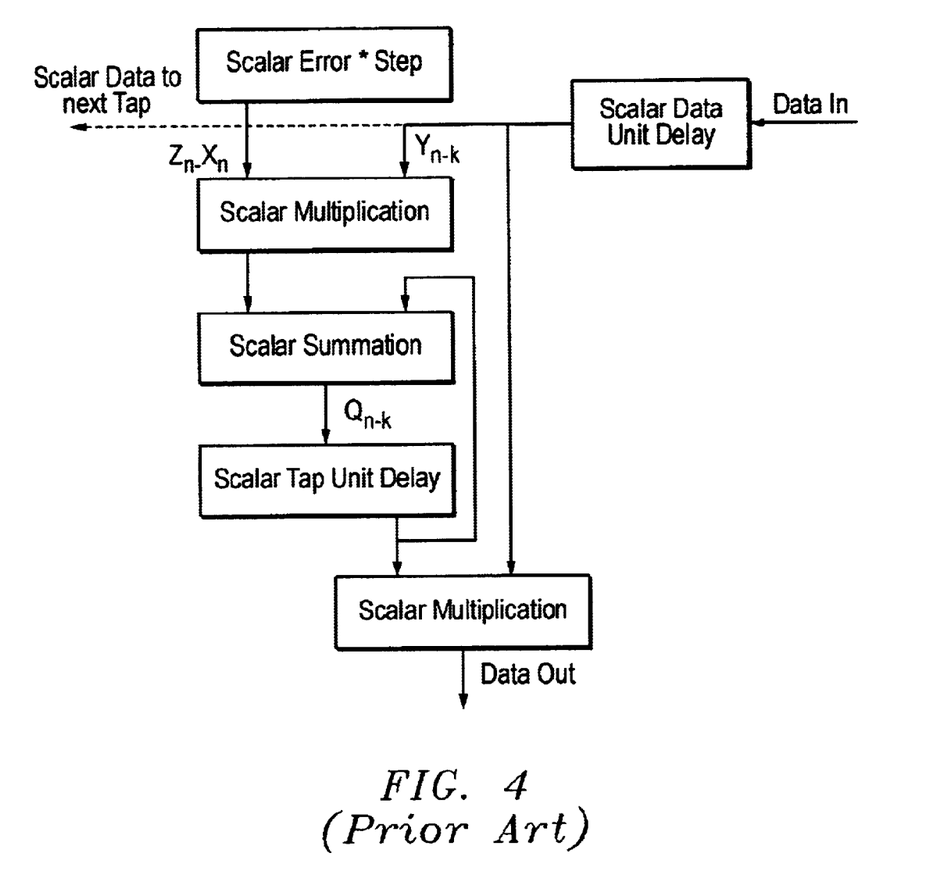
FIG. 4 is a block diagram of a single tap of a one dimensional equalizer known in the prior art.

The present invention for the 4D-EQLFXC 212 is similar to a one-dimensional least mean square equalizer (1D-EQL), but the present invention provides the additional advantage of canceling FEXT by performing vector operations instead of scalar operations used in a 1D-EQL. Each tap of 4D-EQLFXC coefficients becomes a 4×4 symmetric matrix instead of a scalar. The similarity of the tap operation for the two equalizers is illustrated in FIGS. 3 and 4. The difference is that the 4D-EQLFXC in FIG. 3 uses vector and matrix operations where the 1D-EQL in FIG. 4 uses scalar operations.

Referring now to FIG. 3, if all of the taps of the 4D-EQLFXC are considered together, the received data vector $Y_n$ is passed through a series of Unit Delay operators 301 so that successive taps see as input data $Y_n$, $Y_{n-1}$, $Y_{n-2}$, .... Matrix Multiplication operator 303 receives the 1×N matrix $Y_{n-k}$ matrix from unit delay operators 301 and multiplies it with the N×1 matrix of scaled vector error (gradient) data $(Z_n - X_n)$ from Vector Error Scaling operator 302. Matrix Summation operator 304 receives from Matrix Multiplication operator 303 a N×N matrix of adjustments to the matrix $Q_{n-k}$. Matrix Summation operator 304 adds the adjustment to the $Q_{n-k}$ matrix and outputs the corrected matrix, $Q_{n-k}$, to Matrix Tap Unit Delay operator 305. Matrix Tap Unit Delay operator 305 introduces a one cycle delay so that $Q_{n-k}$ arrives at matrix Multiplication operator 306 a cycle later when $Y_{n-k+1}$ arrives from Vector Data Unit Delay operator 306.

Figure 5A:
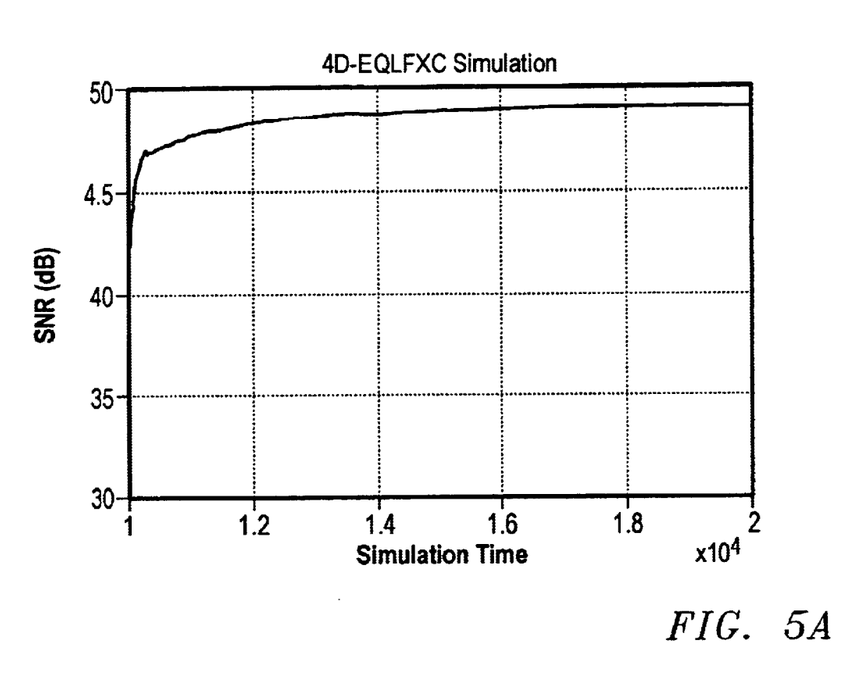
FIG. 5a is a graph of the signal to noise ratio versus convergence time in a four dimensional equalizer in accordance with the present invention.
Figure 5B:
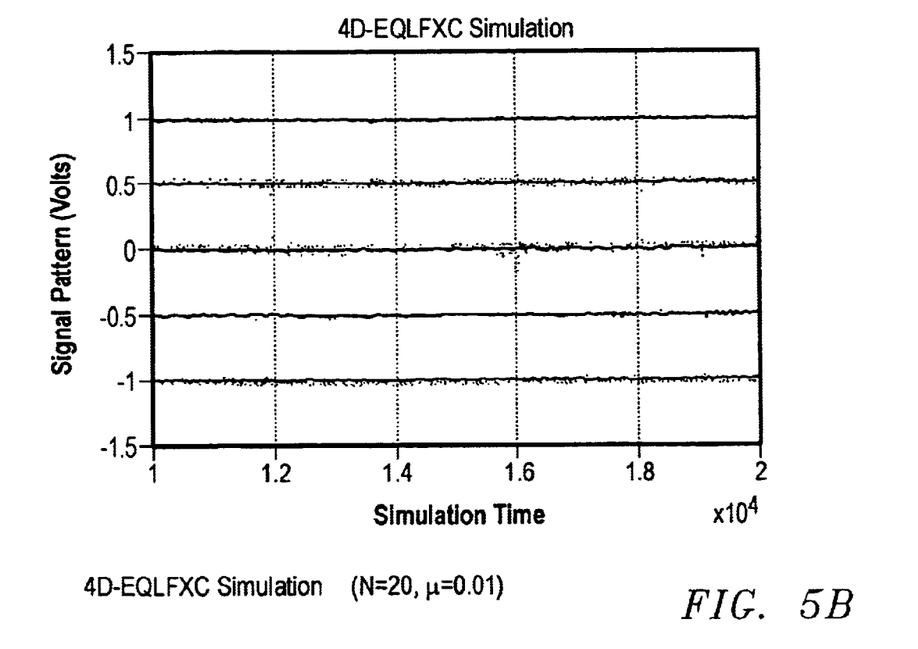
FIG. 5b is a graph of the signal pattern versus convergence time in a four dimensional equalizer in accordance with the present invention.
Figure 6A:
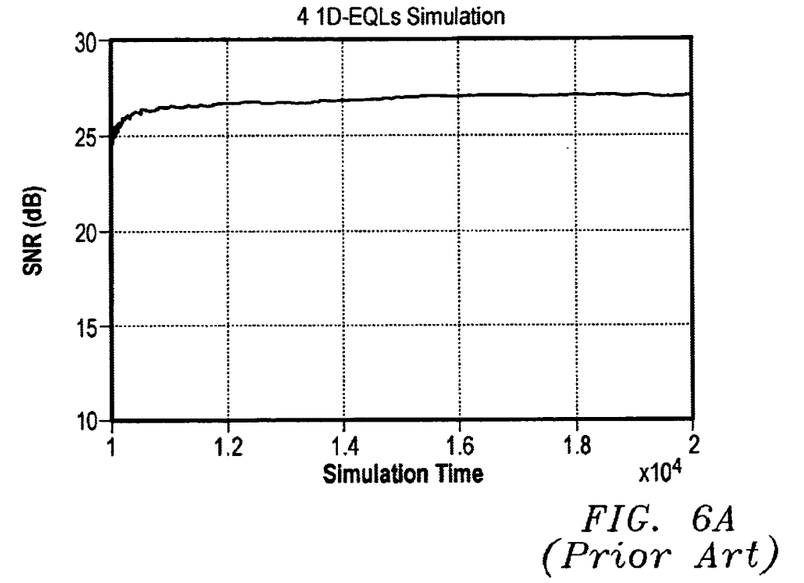
FIG. 6a is a graph of the signal to noise ratio versus convergence time in a conventional one dimensional equalizer known in the prior art.
Figure 6B:
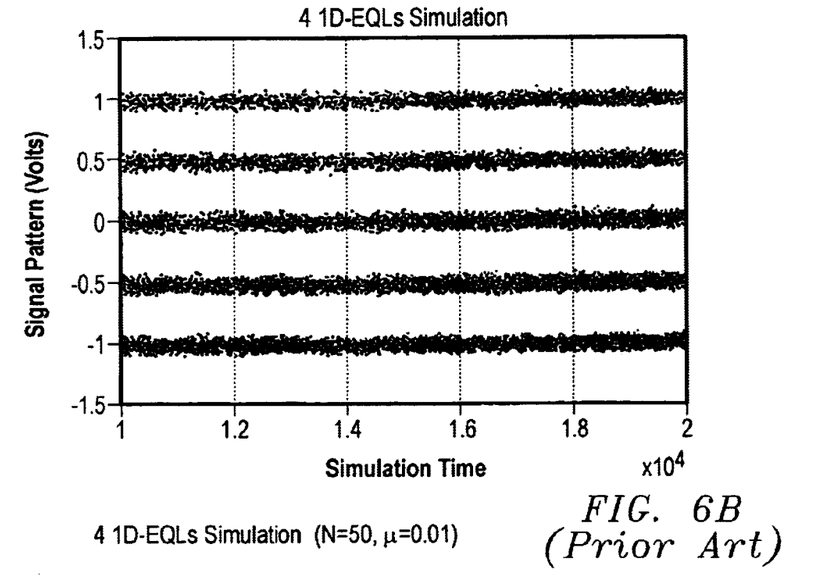
FIG. 6b is a graph of the signal pattern versus convergence time in a four dimensional equalizer known in the prior art.

The performance of a simulated 4D-EQLFXC in accordance with the present invention is shown in FIGS. 5a and 5b, while the performance of a simulated 1D-EQL is shown in FIGS. 6a and 6b. In FIGS. 5a and 6a, the results of the simulation shows the 4D-EQLFXC having an overall signal to noise ratio (SNR) advantage of 22 dB compared to the 1D-EQL. Note that the SNR is calculated on one result after subtraction between feed-forward equalizer 208 and decision-feedback equalizer 210, and another result after subtraction between the first result and the signal after decision circuits.

A 4D-EQLFXC is computationally more complex than four 1D-EQLs with the same number of taps, so using the same number of taps in each case could be viewed as an uneven comparison. But, the computational complexity, in either case, can be estimated as the number of coefficients that are updated each cycle.

In order to compare the two approaches on an even basis, the number of taps has been adjusted so that the 200 coefficients must be updated in each simulation. For the 4D-EQLFXC there are ten such coefficients per tap whereas for the four 1D-EQLs there are only four coefficients per tap. Since 20 taps are used for the 4D-EQLFXC, 50 taps are used for each 1D-EQL.

The 4D-EQLFXC of the present invention exhibits significantly better noise margin compared to multiple scalar equalizers and advantageously permits the use longer cable runs or the use of physical channels that are in some way inferior.

These present invention can be extended and generalized to provide an "N" dimensional EQLFXC for N-channel full-duplex communication and is applicable to other communications systems in addition to Ethernet networks.

While the present invention is described in the context of a communication network, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other media storage and distribution systems.

Additionally, the foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. An apparatus for use-in a communication network, the apparatus comprising:

an input node configured to receive an input signal vector; and a multi-dimensional equalizer coupled to the input node, wherein the multi-dimensional equalizer is configured to cancel far end cross talk and intersymbol interference, wherein the multi-dimensional equalizer is configured to process the input signal vector to provide an output signal wherein the multi-dimensional equalizer is configured to combine the input signal vector with a vector error to determine a multidimensional steepest descent gradient, and further wherein the input signal vector is adjusted with the descent gradient to provide the output signal vector.

2. The apparatus as set forth in claim 1, wherein the equalizer determines the vector error based on the output signal vector and an input channel signal vector.

3. The apparatus as set forth in claim 2, further comprising an echo canceler, wherein the input signal vector is based on the input channel signal vector after it is adjusted with the echo canceler.

4. The apparatus as set forth in claim 2, further comprising a near end cross talk canceler, wherein the input signal vector is based on the input channel signal vector after it is adjusted by the near end cross talk canceler.

5. A method comprising:

canceling far end cross talk and intersymbol interference in a communication network, wherein canceling far end cross talk and intersymbol interference comprises:

estimating a change in error between an input signal vector and an output signal vector;

determining a multidimensional steepest descent gradient based on the change in error;

adjusting the output signal vector using the descent gradient.

6. The method as set forth in claim 5, wherein estimating the change in error between the input signal vector and the output signal vector includes determining the partial derivative of the error with respect to a tap matrix.

7. The method as set forth in claim 6, wherein estimating the change in error between the input signal vector and the output signal vector includes updating the tap matrix by a vector amount that is proportional to the partial derivative of the error.

8. The method as set forth in claim 7, wherein estimating the change in error between the input signal vector and the output signal vector includes assuming that the tap matrix is symmetric.

9. The method as set forth in claim 6, wherein estimating the change in error between the input signal vector and the output signal vector includes performing vector operations.

10. The method as set forth in claim 6, wherein estimating the change in error between the input signal vector and the output signal vector includes passing the input signal vector through a series of unit delay operators.

* * * * *